United States Patent
Tucker et al.

(10) Patent No.: US 6,792,107 B2
(45) Date of Patent: Sep. 14, 2004

(54) DOUBLE-TALK DETECTOR SUITABLE FOR A TELEPHONE-ENABLED PC

(75) Inventors: Luke A. Tucker, Sydney (AU); Mark Greig Wildie, Sydney (AU)

(73) Assignee: Lucent Technologies Inc., Murray Hill, NJ (US)

( * ) Notice: Subject to any disclaimer, the term of this patent is extended or adjusted under 35 U.S.C. 154(b) by 550 days.

(21) Appl. No.: 09/771,260

(22) Filed: Jan. 26, 2001

(65) Prior Publication Data

US 2003/0007633 A1 Jan. 9, 2003

(51) Int. Cl.[7] ............................. H04M 1/00; H04B 3/20
(52) U.S. Cl. ......................... 379/406.08; 379/406.12; 379/406.01; 379/406.13; 379/390.02; 370/286; 370/290
(58) Field of Search ...................... 379/406.01, 406.02, 379/406.05, 406.06, 406.08, 406.09, 406.11, 406.12, 406.13, 417, 416, 391, 392.01, 392, 413, 413.01, 413.02, 390.02, 390.01, 394, 395; 370/287, 288, 289, 290

(56) References Cited

U.S. PATENT DOCUMENTS

| | | | |
|---|---|---|---|
| 5,463,618 A | | 10/1995 | Furukawa et al. ......... 370/32.1 |
| 5,696,821 A | * | 12/1997 | Urbanski ............... 379/406.01 |
| 5,721,772 A | | 2/1998 | Haneda et al. .............. 379/406 |
| 5,732,134 A | | 3/1998 | Sih ............................ 379/406 |
| 5,761,318 A | * | 6/1998 | Shimauchi et al. ........... 381/86 |
| 6,049,606 A | | 4/2000 | Ding et al. ................. 379/406 |
| 6,185,300 B1 | * | 2/2001 | Romesburg ................ 379/410 |
| 6,192,126 B1 | * | 2/2001 | Koski ........................ 379/410 |
| 6,563,803 B1 | * | 5/2003 | Lee ....................... 379/406.01 |

* cited by examiner

Primary Examiner—Rexford Barnie

(57) ABSTRACT

A double-talk detector (109) for an acoustic echo canceler (104) of a VoIP terminal (101) converts (216,226) received far-end signals (212) and transmitted near-end signals (222) into the frequency domain and high-pass filters out (218, 228) low-frequencies representing noise to obtain a complex reference signal and a complex error signal, respectively. It then correlates (230) the complex signals and computes (232) the instantaneous error energy (234) and smoothed (long-term average) error energy (235) of the complex error signal. If the convergence value is below 0.06 (300), the signals are converged and double-talk detection is enabled (306). If the convergence value is above 0.09 (312), the signals are diverged and double-talk detection is disabled (316). If double-talk detection is not enabled, an error threshold (236) is set (304,318) to the value of the smoothed error energy. If double-talk detection is enabled (320), presence of double-talk is indicated (328) if the instantaneous error energy value exceeds (324) the error threshold, and absence of double-talk is indicated (326) if the instantaneous error energy value does not exceed (324) the error threshold.

13 Claims, 2 Drawing Sheets

DOUBLE-TALK DETECTOR SUITABLE FOR A TELEPHONE-ENABLED PC

TECHNICAL FIELD

This invention relates to echo cancelling in general and to double-talk detection in particular.

BACKGROUND OF THE INVENTION

Double-talk occurs when both parties to a telephone call are talking at the same time. An acoustic echo canceller (AEC), employed to cancel echoes at either end of the call, needs to be able to detect double-talk in order to operate properly. An AEC identifies the impulse response of the acoustic echo path between the near-end (local) loudspeaker and microphone, generates a replica of the echo by using an adaptive filter, and subtracts the echo replica from the microphone output to cancel the echo of the far-end speech. The adaptive filter uses the far-end speech as a reference signal. If the adaptive filter is allowed to adapt in the presence of near-end speech, the near-end speech will be added to the error signal which drives filter tap coefficient adaptation, thereby corrupting the estimate of the acoustic echo path. Therefore, the acoustic echo canceller must suspend its adaptation to the impulse response of the acoustic echo path while double-talk is present.

The prior art includes two approaches to double-talk detection. One approach assumes that the energy level of the echo is a given fraction of the energy level of the near-end speech. But this is an invalid assumption in the case of a telephony-enabled personal computer (PC), where arbitrary gain can be applied to the loudspeaker independently of the PC, and hence the echo can actually be greater than the original reference signal and even greater than the near-end speech. The other approach is to examine the content of the signal by using cepstral analysis, thereby allowing individual talkers to be identified within the signal. But this is a highly-complex solution, too computationally-complex and slow to be carried out during real-time operation on a typical end-user PC. Hence, the prior art does not offer a suitable technique for double-talk detection in a telephony-enabled PC.

SUMMARY OF THE INVENTION

This invention is directed to solving these and other problems and disadvantages of the prior art. According to the invention, double-talk detection is effected as follows. A cross-correlation is effected between a received far-end signal and a transmitted near-end signal to determine their level of convergence, signal energy of the transmitted near-end signal is determined, and average signal energy is determined from the signal energy of the transmitted near-end signal and signal energy of any previously-transmitted near-end signal. Preferably, prior to the above activities the transmitted near-end signal and the received far-end signal are transformed to make double-talk detection more efficient, such as by being converted to the frequency domain. Also preferably, prior to those above activities the near-end and far-end signals are filtered to remove noise signal energy therefrom. Following the above activities, double-talk detection is enabled if a comparison of the level of convergence with a first threshold indicates that the signals are converged, and double-talk detection is disabled if a comparison of the level of convergence with a second threshold indicates that the signals are diverged. If double-talk detection is not enabled, then an error threshold is set to the average signal energy. If double-talk detection is enabled, presence of double-talk is indicated if the signal energy of the transmitted near-end signal exceeds the error threshold, and absence of double-talk is indicated if the signal energy of the transmitted near-end signal does not exceed the error threshold.

Advantageously, the invention is not dependent upon any preset energy thresholds (i.e., it does not require assumptions and predictions about relative energy levels to be made), and it is computationally efficient.

While the invention has been characterized in terms of a method, it also encompasses apparatus that performs the method. The apparatus preferably includes an effector—any entity that effects the corresponding step, unlike a means—for each step. The invention further encompasses any computer-readable medium containing instructions which, when executed in a computer, cause the computer to perform the method steps.

These and other features and advantages of the invention will become more apparent from the following description of an illustrative embodiment of the invention considered together with the drawing.

DETAILED DESCRIPTION

Figure 1:
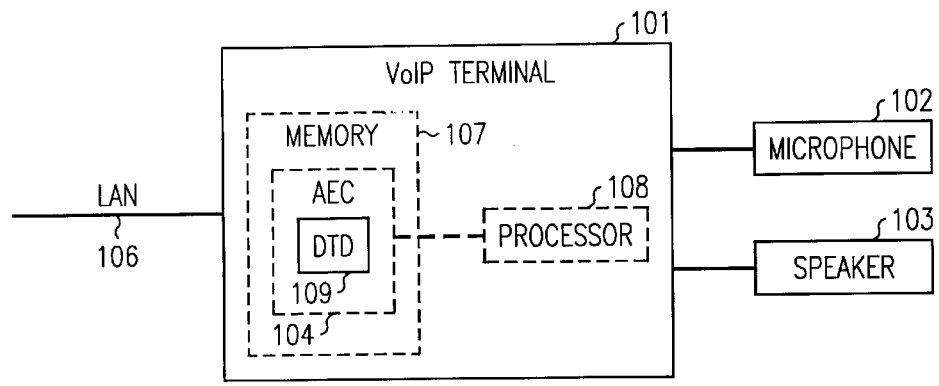
FIG. 1 is a block diagram of a communications terminal that includes an illustrative embodiment of the invention.

FIG. 1 shows a Voice-over-Internet Protocol (VoIP) communications apparatus. It comprises a user VoIP terminal 101 that is connected to a VoIP communications link 106. Illustratively, terminal 101 is a voice-enabled personal computer and VoIP link 106 is a local area network (LAN). Terminal 101 is equipped with at least one microphone 102 and speaker 103. Devices 102 and 103 can take many forms, such as a telephone handset, a telephone headset, and/or a speakerphone. Terminal 101 receives packets on LAN 106 from a corresponding terminal or another source (far-end talker), disassembles them, converts the digitized samples carried in the packets' payloads into an analog signal, and sends it to speaker 103. This process is reversed for input from the local source (near-end talker) through microphone 102 to LAN 106. Undesirably, some of the output of speaker 103 is acoustically coupled to microphone 102 and causes an echo in the output of microphone 102. To eliminate this echo, terminal 101 is equipped with an acoustic echo canceler (AEC) 104 that includes a double-talk detector (DTD) 109. AEC 104 is located within the audio component of terminal 101 which deals with packetizing and unpacketizing of voice signals into and from real-time transport protocol (RTP) packets and with communicating with a sound card to allow recording and playback of sound. AEC 104 communicates directly with the sound-card drivers, as it must be invoked prior to any encoding and packetizing of voice. DTD 109 is used to detect voice signals incoming simultaneously from the far-end talker (LAN 106) and the near-end talker (microphone 102).

Figure 2:
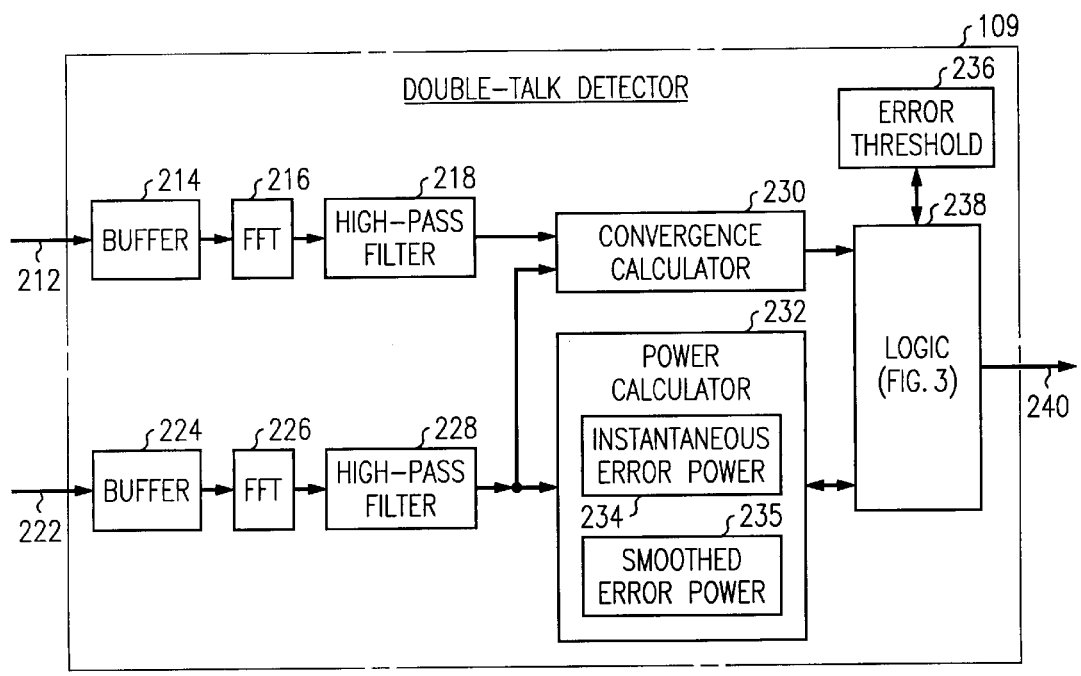
FIG. 2 is a block diagram of a double-talk detector of the terminal of FIG. 1.

According to the invention, an illustrative embodiment of DTD 109 takes the form shown in FIG. 2. DTD 109 may be implemented in dedicated hardware such as an integrated circuit, in general-purpose hardware such as a digital-signal processor, or in software stored in a memory 107 of terminal 101 and executed on a processor 108 of terminal 101. DTD 109 receives over a link 212 the voice traffic carried by packets over LAN 106 to terminal 101. The received voice traffic represents digital samples of an analog signal taken at an 8 KHz rate. DTD 109 buffers two sets of consecutive samples of the received voice traffic in a buffer 214. These sets can be of any size, but this embodiment illustratively uses sets of 240 samples representing 30 milliseconds of voice signal. DTD 109 feeds the buffered pair of sets to a fast Fourier transform (FFT) 216, discards the first-received set, waits to receive a next set of 240 consecutive samples, and again feeds the buffered pair of sets to FFT 216, ad infinitum.

FFT 216 performs a discrete Fourier transform on each received pair of sets (480 samples) to convert the samples into the frequency domain. Preferably, for efficiency purposes, FFT 216 performs either a radix 2, a radix 4, or a prime-factor radix FFT on the received samples. In FFT 216, the 480 samples in the time domain become 480 bins in the frequency domain, with 240 bins representing negative frequencies and 240 bins representing positive frequencies. As the signals in the time domain are entirely real, the negative frequencies are symmetrical with the positive frequencies and so do not need to be considered. Frequency range per bin is calculated as 4000 Hz/240=16.66 Hz, where 4000 Hz is the frequency ceiling of the sampled signal and 240 is the number of positive frequency bins.

The 240 positive frequency bins (frequency ranges) output by FFT 216 are then high-pass filtered in a filter 218 to filter out sound-card and microphone noise distortion. This distortion mainly occurs at the low frequencies represented by the first ten bins. This noise is filtered out by merely discarding the first ten bins. This produces a high-frequency-domain representation of the signal. Since the frequency per bin is 16.66 Hz, the net effect of discarding the first ten bins is to filter the signal with a high-pass filter having a cutoff at 166 Hz. Any significant signal energy that remains after filtering is due to voice. The output of high-pass filter 218 is referred to herein as the complex reference signal.

DTD 109 also receives over a link 222 a signal representing transmitted near-end sound. This signal constitutes digital samples taken at an 8 KHz rate of the difference signal between the signal produced by microphone 102 and an estimate of the echo signal conventionally generated by AEC 104. A buffer 224 buffers a set of 240 consecutive samples received on link 222 representing 30 milliseconds of the difference signal, pads the buffered set with another set of 240 null (zero) samples, and feeds the padded set to an FFT 226. FFT 226 performs a discrete Fourier transform on each received padded set of samples to convert them into 240 positive bins in the frequency domain, in the manner described above for FFT 216. A high-pass filter 228 then filters out noise energy by discarding the first ten positive bins, as described above for high-pass filter 218. This produces a high-frequency-domain representation of the transmitted near-end signal. The output of high pass-filter 228 is also referred to herein as the complex error signal. The complex error signal represents residual echo if the far-end (complex reference signal) is the only talker, represents residual echo plus the near-end speech if double-talk is occurring, and represents the near-end speech if the near end (microphone 102) is the only talker.

Figure 3:
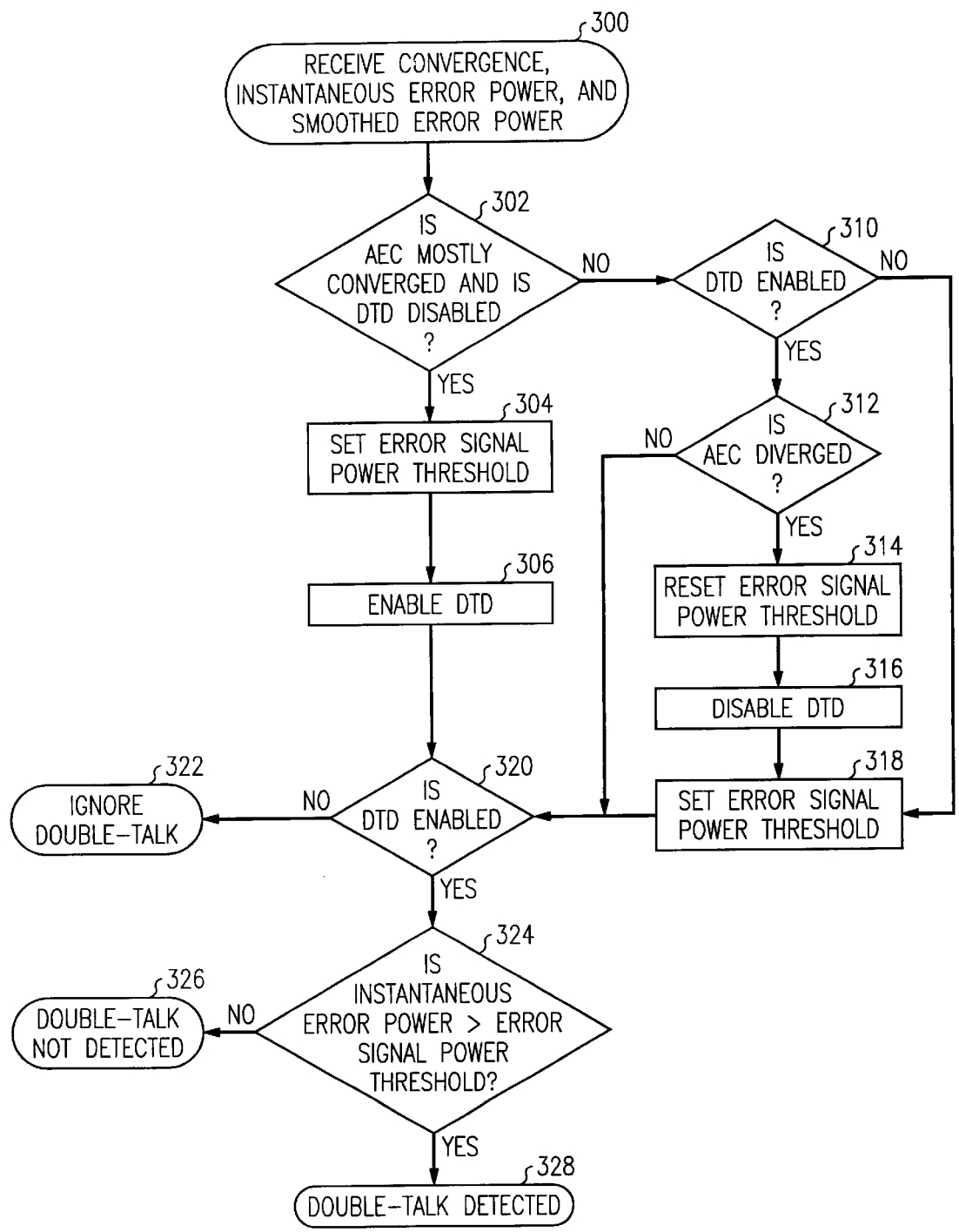
FIG. 3 is a functional flow diagram of operation of logic of the double-talk detector of FIG. 2.

The complex reference signal and the complex error signal are input to a convergence calculator 230, and the complex error signal is input to a energy calculator 232. Convergence calculator 230 performs a conventional normalized cross-correlation between the input signals to provide a measure of the level of convergence between them that AEC 104 has achieved. This level of convergence is used when deciding whether or not to effect double-talk detection. Energy calculator 232 computes the instantaneous error energy value 234 of the transmitted near-end signal by summing the signal amplitude of the 230 bins (bins 11–240) of each sample set. Energy calculator 232 also computes the smoothed (long-term average) error energy value 235 of successive sample sets. The smoothed error energy value 235 is used as a threshold for determining double-talk, and is calculated as $$P'_1 = sf \cdot P'_0 + (1-sf)P_1$$

where $P'_1$ is the new smoothed error energy, $P'_0$ is the current smoothed error energy, $P_1$ is the current instantaneous error energy, and "sf" is a smoothing factor, typically between 0.8 and 0.9, whose experimentally-determined illustrative value in this example is 0.8. Results of the computations of convergence calculator 230 and energy calculator 232 are provided to logic 238 which uses them to effect double-talk detection. Logic 238 uses smoothed error energy value 235 along with the property that changes in acoustic conditions (microphone moves, speaker volume turned up, reference signal amplitude change) result in a marked increase in the normalized cross correlation, while the near-end talker does not. Thus, if instantaneous error energy value 234 rises above smoothed error energy value 235 and the cross correlation value does not rise above a specified point, this is indicative of double-talk. If instantaneous error energy value 234 rises above smoothed error energy value 235 and the cross-correlation value rises above the specified point, this is indicative of changing acoustic conditions and double-talk detector 109 is reset to its initial state, i.e., to find a suitable converged energy level. If instantaneous error energy value 234 does not rise above smoothed error energy value 235 and the cross-correlation value rises above a specified point, this is indicative of changing acoustic conditions and double-talk detector 109 is reset to its initial state, i.e., to find a suitable converged energy level. And if instantaneous error energy value 234 does not rise above smoothed error energy value 235 and the cross-correlation value does not rise above the specified point, this is indicative of consistent converged acoustic conditions and no near-end speech, so convergence is continued. The functionality of logic 238 is diagrammed in FIG. 3.

Upon receipt of the inputs from elements 230 and 232, at step 300, logic 238 determines if AEC 104 is mostly converged and if double-talk detection (DTD) is disabled (the starting condition of DTD), at step 302. The determination of convergence is made by comparing the normalized cross-correlation computed by convergence calculator 230 against a threshold representing a reasonable level of convergence. In this illustrative embodiment, the convergence threshold is selected to be 0.06. Once convergence has reached this threshold or a lower value, AEC 104 is considered to have mostly converged. A mostly-converged AEC 104 indicates that double-talk detection may be undertaken, but DTD being disabled means that error signal energy threshold 236 must be set before double-talk detection may be undertaken. Logic 238 therefore sets error signal energy threshold 236 to the present value of smoothed error energy 235, at step 304, enables DTD, at step 306, and then proceeds to steps 320 et seq. to perform DTD. If either AEC 104 is not mostly converged or DTD is enabled, as determined at step 302, logic 238 checks whether DTD is enabled, at step 310. If not, logic 238 sets error threshold 236 to the present value of smoothed error energy 235, at step 318, and then proceeds to steps 320 et seq. If DTD is found to be enabled at step 310, then logic 238 checks whether AEC 104 is diverged, at step 312. Divergence is caused by changing acoustic conditions and changes in amplitude. The determination of divergence is made by comparing the normalized cross-correlation computed by convergence calculator 230 against a threshold representing a reasonable level of divergence. In this illustrative embodiment, the threshold is selected to be 0.09. If convergence exceeds this value, AEC 104 is diverged and DTD cannot be effected. Logic 238 therefore resets error threshold 236, at step 314, and disables DTD, at step 316. Logic 238 then sets a new error threshold 236 to the present value of smoothed error energy 235, at step 318, and then proceeds to steps 320 et seq. If AEC 104 is found to not be diverged at step 312, operation merely proceeds to steps 320 et seq.

At step 320, logic 238 checks whether DTD is enabled. If not, logic 238 cannot effect DTD and therefore ignores any double-talk, and so indicates on link 240, at step 322. If DTD is enabled, logic 238 checks whether instantaneous error energy 234 exceeds error threshold 236, at step 324. If not, double-talk has not been detected and logic 238 so indicates on link 240, at step 326; if so, then the transmitted near-end signal does not contain just the residual of a canceled far-end signal but also contains near-end voice. This is known because the signals are mostly converged, and therefore the residual should be very small. Therefore, double-talk has been detected, and logic 238 so indicates on link 240, at step 328. Logic 238 then repeats its operations upon the next input from calculators 230 and 232.

Of course, various changes and modifications to the illustrative embodiments described above will be apparent to those skilled in the art. For example, energy may be determined either in the frequency domain or in the time domain, with the high-pass filtering being done in the same domain as the energy determination. Also, both high-pass filters 128 and 228 may be omitted. Or, the DTD may be combined with far-end voice-activity detection (VAD) to adjust the transmitted near-end signal threshold based on the energy level of the far-end talker. The residual error can be expected to increase with the energy of the far-end talker, the far-end VAD may be used to identify the high and low energy sections of the far-end speech, and the transmitted near-end signal threshold may be scaled accordingly. This allows the DTD to be made more sensitive during the low-energy sections of far-end speech. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of detecting double-talk comprising:
   effecting a cross-correlation between a received far-end signal and a transmitted near-end signal to determine their level of convergence;
   determining signal energy of the transmitted near-end signal;
   determining an average signal energy from the signal energy of the transmitted near-end signal and signal energy of any previously-transmitted near-end signals;
   if a comparison of the level of convergence with a first threshold indicates convergence, then enabling double-talk detection;
   if a comparison of the level of convergence with a second threshold indicates divergence, then disabling double-talk detection;
   if double-talk detection is not enabled, then setting an error threshold to the average signal energy;
   if double-talk detection is enabled and the signal energy of the transmitted near-end signal exceeds the error threshold, then indicating presence of double-talk; and
   if double-talk detection is enabled and the signal energy of the transmitted near-end signal does not exceed the error threshold, then indicating absence of double-talk.

2. The method of claim 1 further comprising:
   transforming the received far-end signal and the transmitted near-end signal to enhance efficiency of effecting the cross-correlation of the signals; wherein
   effecting comprises
      effecting a cross-correlation between the transformed received far-end signal and the transformed transmitted near-end signal to determine their level of convergence,
   determining signal energy comprises
      determining signal energy of the transformed transmitted near-end signal, and
   determining an average signal energy comprises
      determining the average signal energy from the signal energy of the transformed transmitted near-end signal and signal energy of any transformed previously-transmitted near-end signals.

3. The method of claim 2 further comprising
   high-pass filtering the received far-end signal and the transmitted near-end signal to eliminate noise energy therefrom; wherein
   effecting comprises
      effecting a cross correlation between the transformed filtered received far-end signal and the transformed filtered transmitted near-end signal to determine their level of convergence,
   determining signal energy comprises
      determining signal energy of the transformed filtered transmitted near-end signal, and
   determining an average signal energy comprises
      determining the average signal energy from the signal energy of the transformed filtered transmitted near-end signal and signal energy of any transformed filtered previously-transmitted near-end signals.

4. The method of claim 2 wherein:
   performing a transform comprises
      converting the received far-end signal and the transmitted near-end signal to frequency-domain representations of said signals.

5. The method of claim 4 wherein:
   converting includes
      deleting negative frequencies from the frequency-domain representation of said signals.

6. The method of claim 5 wherein:
   converting further includes
      deleting low frequencies from the frequency-domain representations of said signals to eliminate noise-signal representations therefrom.

7. A method of detecting double-talk comprising:
   converting a received far-end signal and a transmitted near-end signal to frequency-domain representations of said signals;
   deleting negative and low frequencies from the frequency-domain representations of said signals to obtain high-frequency-domain representations of said signals;
   effecting a cross-correlation between the high-frequency-domain representations of said signals to determine their level of convergence;

determining signal energy of the high-frequency-domain representation of the transmitted near-end signal;

determining an average signal energy from the signal energy of the high-frequency-domain representation of the transmitted near-end signal and signal energy of high-frequency-domain representations of any previously-transmitted near-end signals;

if a comparison of the level of convergence with a first threshold indicates convergence, then enabling double-talk detection;

if a comparison of the level of convergence with a second threshold indicates divergence, then disabling double-talk detection;

if double-talk detection is not enabled, then setting an error threshold to the average signal energy;

if double-talk detection is enabled and the signal energy of the high-frequency-domain representation of the transmitted near-end signal exceeds the error threshold, then indicating presence of double-talk;

if double-talk detection is enabled and the signal energy of the high-frequency-domain representation of the transmitted near-end signal does not exceed the error threshold, then indicating absence of double-talk; and repeating the above steps.

8. The method of claim 7 wherein:

converting comprises performing a Fourier transform on said signals.

9. The method of claim 7 wherein:

effecting a cross-correlation comprises effecting a normalized cross-correlation between the high-frequency-domain representations of the signals.

10. The method of claim 9 wherein the first threshold is about 0.06, and the second threshold is about 0.09.

11. An apparatus that performs the method of one of the claims 1–10.

12. A computer-readable medium containing executable instructions representing a computer program which, when executed in a computer, cause the computer to function in the fashion of one of the claims 1–10.

13. An acoustic echo canceler including a double-talk detector comprising:

an effector of cross correlation between a received far-end signal and a transmitted near-end signal to determine said signals' level of convergence;

an effector of determining signal energy of the transmitted near-end signal and of determining an average energy from the signal energy of the transmitted near-end signal and signal energy of any previously-transmitted near-end signals;

an effector of enabling double-talk detection in response to a comparison of the level of convergence with a first threshold indicating convergence, and of disabling double-talk detection in response to a comparison of the level of convergence with a second threshold indicating divergence;

an effector of setting an error threshold to the average signal energy in response to double-talk detection not being enabled; and an effector, responsive to double-talk detection being enabled, of indicating presence of double-talk in response to the signal energy of the transmitted near-end signal exceeding the error threshold, and of indicating absence of double-talk in response to the signal energy of the transmitted near-end signal not exceeding the error threshold.

* * * * *